Figure 1:
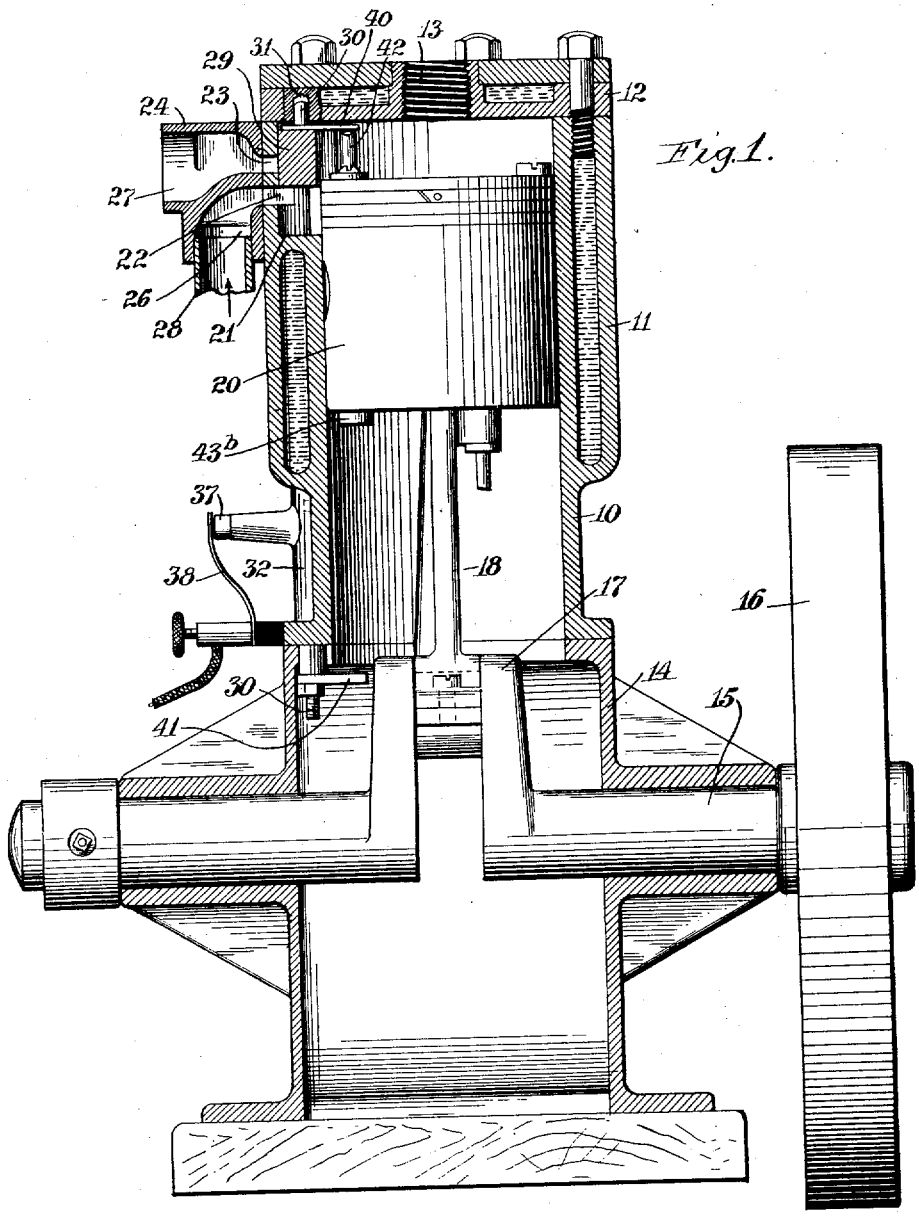

G. E. McELROY.

GAS ENGINE.

APPLICATION FILED JUNE 20, 1914.

Reissued Dec. 8, 1914.

13,843.

5 SHEETS—SHEET 1.

George E. McElroy
Inventor

Witnesses
S. M. Johnson
Irving Katz

By Robt B. Killgore
Attorney

THE NORRIS PETERS CO., PHOTO-LITHO., WASHINGTON, D. C.

G. E. McELROY.

GAS ENGINE.

APPLICATION FILED JUNE 20, 1914.

Reissued Dec. 8, 1914.

13,843.

5 SHEETS—SHEET 2.

George E. McElroy
Inventor

Witnesses
[illegible]
Irving Katz

By Robt B. Killgore
Attorney

THE NORRIS PETERS CO., PHOTO-LITHO., WASHINGTON, D. C.

G. E. McELROY.

GAS ENGINE.

APPLICATION FILED JUNE 20, 1914.

Reissued Dec. 8, 1914.

13,843.

5 SHEETS—SHEET 3.

George E McElroy
Inventor

Witnesses
C. A. Mitchell
Irving Katz

By Robt B Killgore
Attorney

THE NORRIS PETERS CO., PHOTO-LITHO., WASHINGTON, D. C.

G. E. McELROY.

GAS ENGINE.

APPLICATION FILED JUNE 20, 1914.

Reissued Dec. 8, 1914.

13,843.

5 SHEETS—SHEET 4.

George E. McElroy
Inventor

Witnesses
E. Mitchell
Irving Katz

By Robt B. Gillgor
Attorney

THE NORRIS PETERS CO., PHOTO-LITHO., WASHINGTON, D. C.

G. E. McELROY.

GAS ENGINE.

APPLICATION FILED JUNE 20, 1914.

Reissued Dec. 8, 1914.

13,843.

5 SHEETS—SHEET 5.

George E. McElroy
Inventor

Witnesses
S. Mitchell
Irving Katz

By Robt B. Killgore
Attorney

THE NORRIS PETERS CO., PHOTO-LITHO., WASHINGTON, D.C.

UNITED STATES PATENT OFFICE.

GEORGE E. McELROY, OF NEWARK, NEW JERSEY, ASSIGNOR TO McELROY ENGINE COMPANY, OF NEWARK, NEW JERSEY, A CORPORATION OF NEW JERSEY.

GAS-ENGINE.

13,843. Specification of Reissued Letters Patent. Reissued Dec. 8, 1914.

Original No. 1,063,368, dated June 3, 1913, Serial No. 677,851. Application for reissue filed June 20, 1914. Serial No. 846,399.

*To all whom it may concern:*

Be it known that I, GEORGE E. McELROY, a citizen of the United States, of the city of Newark, county of Essex, and State of New Jersey, have invented a new and useful Improvement in Gas-Engines, of which the following is a full, clear, and exact description.

My invention relates to improvements in gas or explosive engines, and the general object of my invention is to improve the construction of such engines to the end that great simplicity, durability, cheapness, and high efficiency may be attained.

Another object of my invention is to produce an engine in which the cylinder and valve seat may both be easily and accurately bored without the necessity of any milling or special operation, and in which the valve is arranged so that it has a very easy movement in the wall of the cylinder, and is held to its seat by the internal pressure so that it cannot leak.

Other objects of my invention are to produce an engine in which the parts are perfectly timed, and if out of time can be easily adjusted, in which the internal parts are easily accessible, and especially to produce an engine having a reliable and easy valve stroke and with the valve arranged in such a way that the intake and exhaust ports are both open during practically the whole stroke of the piston, so that an adequate charge is readily admitted to the cylinder, and the dead gases are expelled or exhausted. In this way I relieve the piston of back pressure, and provide for a fresh charge of high efficiency.

A further object of my invention is to reduce the mechanism to few parts, and to arrange these so that there is very little friction.

My invention is also intended to provide a simple mechanism by which the oscillation of the connecting rod or pitman will work the valve by means of a simple mechanism in the piston, and further, my invention comprises an engine in which each cylinder is complete in itself and of such a character that where multiple cylinder engines are used, the cylinders can be added as desired. It will be seen by having my cylinders and contained mechanism of this character, and will be understood from the description which follows, that in case of accident to any part of one cylinder or contained mechanism, the others can continue to operate. It will be further understood from the description which follows, that the simplicity and arrangement of parts enable my engine to be built of light material and to be of light weight in comparison to the power which it yields.

Reference is to be had to the accompanying drawings forming a part of this specification, in which similar reference characters indicate corresponding parts in all the views.

Figure 2:
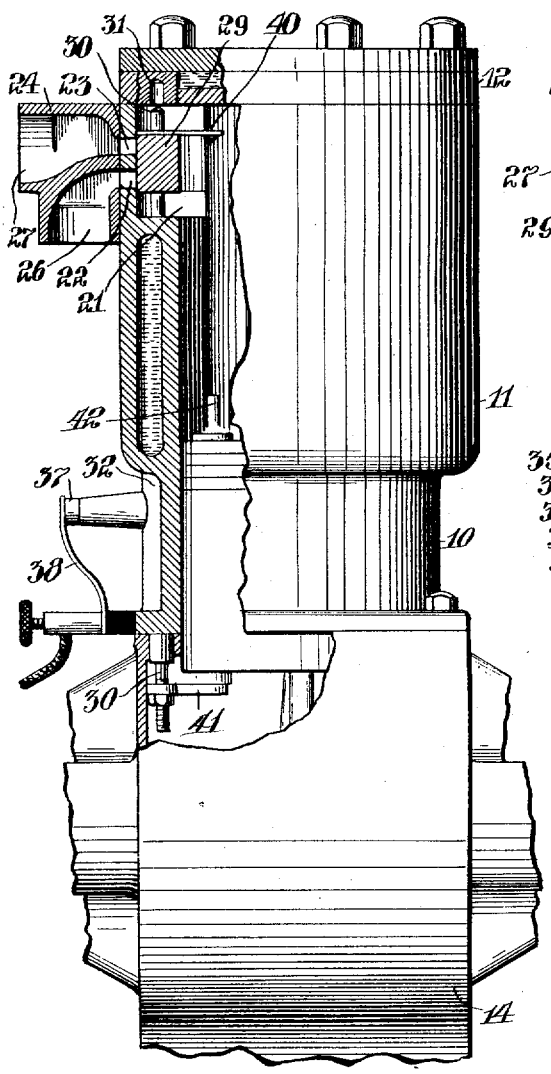
Figure 3:
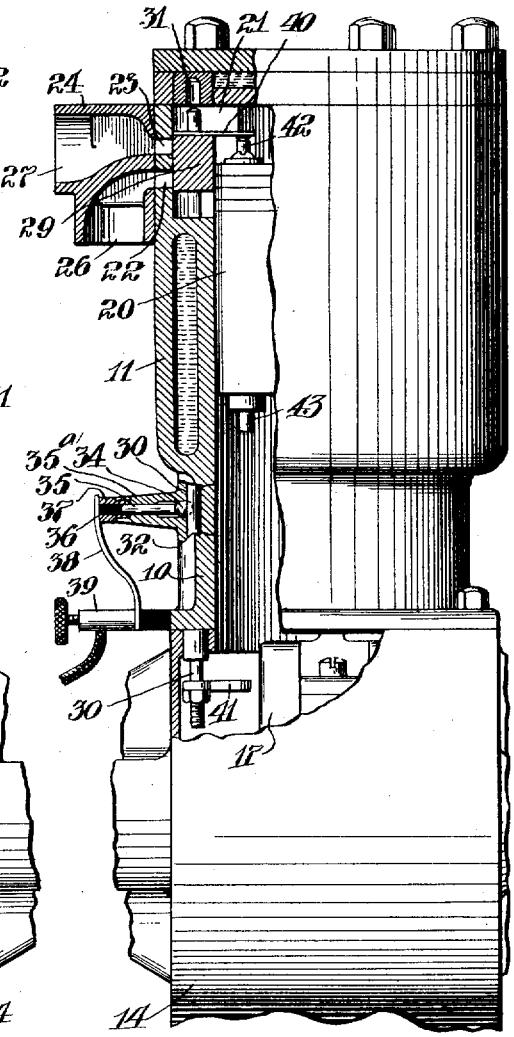
Figure 4:
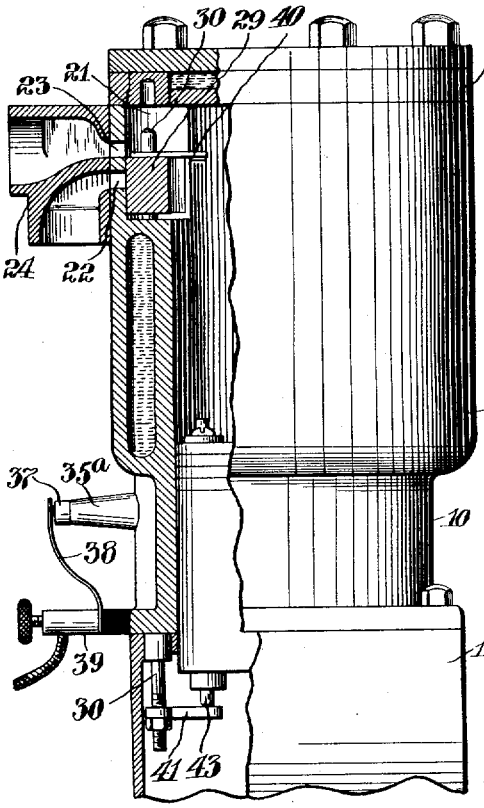
Figure 5:
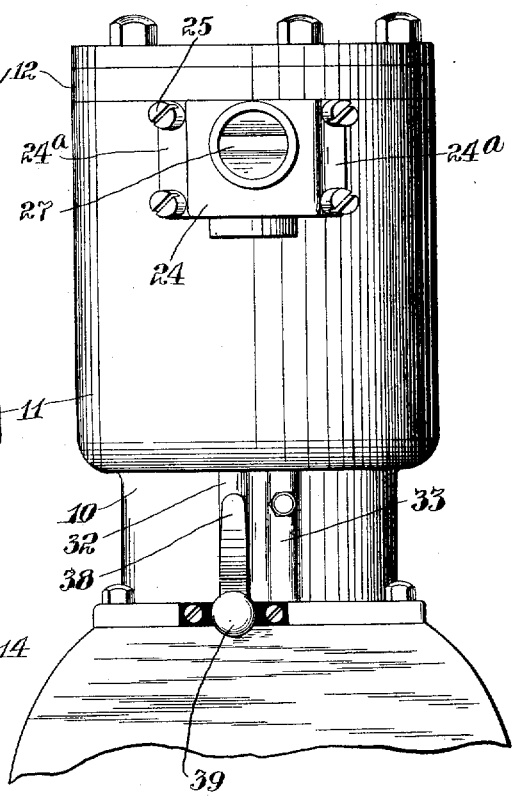
Figure 6:
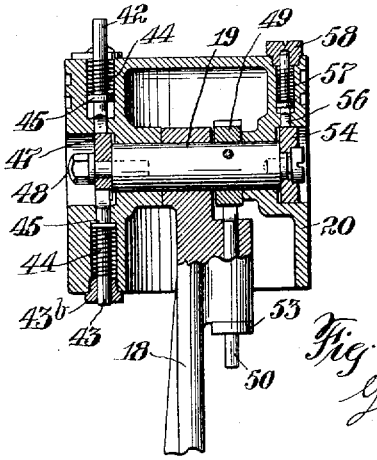
Figure 7:
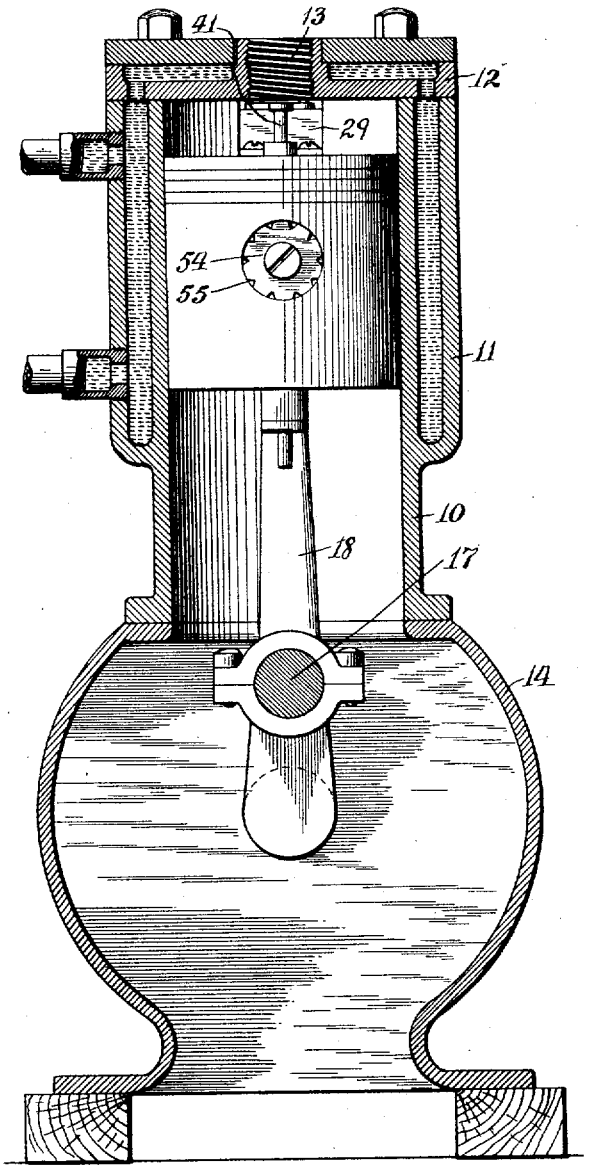
Figure 8:
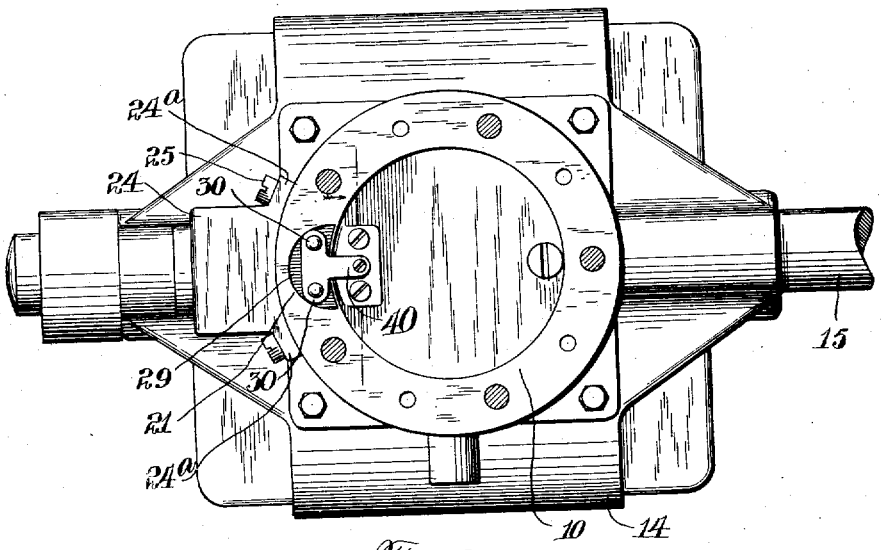
Figure 9:
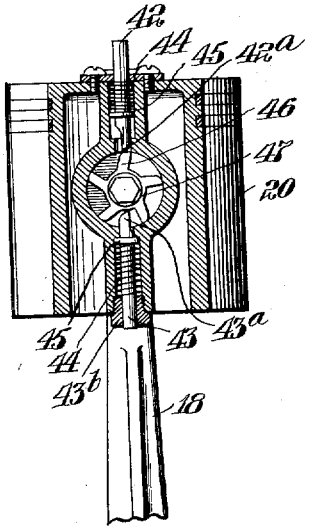
Figure 10:
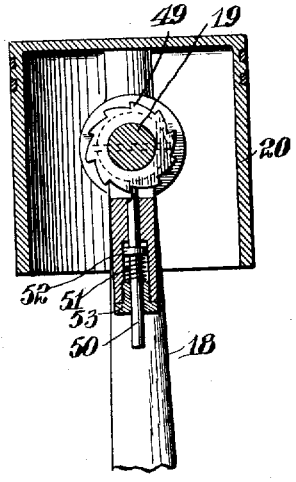

Figure 1 is a detail vertical axial section of the engine embodying my invention. Fig. 2 is a side elevation with parts in section, and with both in-take and exhaust ports closed and with the piston at the lower part of its stroke. Fig. 3 is a view similar to Fig. 2 but with the piston near the upper part of its stroke, and with the valve rod retaining mechanism in section. Fig. 4 is a view similar to Figs. 2 and 3 but with the valve in position to open the exhaust port. Fig. 5 is a broken side elevation of the engine at right angles to the view shown in Fig. 4. Fig. 6 is a detail section through the piston and longitudinally of the wrist pin. Fig. 7 is a vertical cross section of the engine. Fig. 8 is a plan view with the cylinder head removed. Fig. 9 is a vertical section through a portion of the piston and showing the spur wheel for seating the valve actuating pins, and Fig. 10 is a vertical section through the piston and showing in detail the pawl mechanism for actuating the wrist pin and spur wheel.

The engine is provided with a plain cylinder 10 which can be readily bored out from end to end, and which has the customary water jacket 11 and removable head 12, the head having a suitable opening 13 for a spark plug and the whole resting on a suitable base 14 which forms the crank case and carries the shaft 15, this being provided with the customary fly wheel 16. Obviously the base 14 can be of any approved design. The shaft 15 is provided with the usual or any preferred form of crank 17, which is connected by a rod or pitman 18 with the wrist pin 19 which is journaled in the piston 20, the latter reciprocating as usual in the cylinder 10.

The cylinder 10 is provided near the top with intake and exhaust ports 22 and 23 which lead into the space 21 which is in one wall of the cylinder 10, and which forms the seat for the valve 29 hereinafter referred to. Obviously any suitable connections can be made with the ports 22 and 23, but I have shown a convenient means in which a single connection 24 in the form of a casting, is used, and which has flanges 24[a] so that it can be conveniently secured by bolts 25 or otherwise to the face of the cylinder 10, and this connection 24 is provided with openings 26 and 27, the former being suitable for connection with a pipe 28 leading from the carbureter or other source of supply, and the opening 27 serving for the exhaust.

The valve 29 and its operating mechanism is an important feature of the invention, and it will be noticed from the description which follows that this valve is extremely simple, and is operated in such a way that there is no liability of its sticking or leaking. Further, it can be very cheaply and easily made. By reference to Fig. 8 it will be seen that the valve seat 21 can be bored out longitudinally of the cylinder, no milling work being necessary, and likewise the valve 29 can be a section of a cylindrical rod, the rod being simply cut so that the valve will conform to the shape of the valve seat 21 with its inner surface corresponding to the surface of the cylinder wall. It will also be noticed by reference to Fig. 8, that the valve seat and valve when viewed in plan, form a little more than half of a circle, so that the valve is always retained in place and it is open to the pressure from within the cylinder so that it is always pressed snugly to its seat, and yet it will be observed that it can be kept easily lubricated. The valve when arranged as described, also has the advantage of being very easy to move, as it has no springs, and comparatively no back-pressure to work against, and it is operated directly by the piston as hereinafter described.

The valve 29 is carried by the two vertically arranged rods 30 which extend longitudinally through the wall of the cylinder 10, projecting from the lower end thereof as shown, and adapted to extend at the upper end into the sockets 31 in the cylinder head. These rods are movable in ways 32 and 33 in the cylinder wall, and while one rod may be used, it is better to have two, as the valve is thereby better balanced, and has a smoother, freer movement. The valve 29 and the rods 30 move so easily that it is desirable to have a retaining device to cause them to hold the valve 29 in position to close both ports except at the right moment for the intake or exhaust, as will be presently described, and any suitable device can be used. I prefer the means illustrated in Fig. 3, where a ball 34 is arranged to engage a corresponding socket in one or both of the rods 30, and the arrangement disclosed enables the circuit of the spark plug to be broken except when the rods are in the position shown in Fig. 3 with the valve 29 closed to both ports 22 and 23. To provide for this ball 34 is pressed by a rod 35 which moves in the post 35[a], the latter extending out from the cylinder 10, and the rod or pin 35 operates against an insulating bushing 36, this being retained in a plug 37 of conducting material which is carried on the outer end of the post 35[a]. The plug 37 is pressed by the spring 38 which connects with the binding post 39 this being insulated on the cylinder 10 and serving as the ground connection for the spark plug. I have not shown the full circuit, neither have I shown the spark plug, because the circuit and plug may be of any usual kind and I simply wish to illustrate that the circuit is broken when the movement of the valve rod 30 pushes out the ball 34 and bushing 36, thereby releasing the spring 38 from contact with the part 37. Thus it will be seen that an explosion can only occur when the valve 29 is in the correct position, as at other times the circuit is broken. The mechanism just described therefore serves the double purpose of retaining the valve and rod in the desired position, and of breaking the spark plug circuit.

To provide for actuating the valve 29, arms 40 and 41 are provided which are actuated by the piston, the arm 40 being secured to the valve top and extending into the path of the pin 42 on the piston, and the arm 41 being located at the lower end of the valve rods 30 and in the path of the pin 43 of the piston. These pins 42 and 43 are mounted to move vertically in the piston as shown best in Fig. 9, and they are normally pressed inward by springs 44 which are held to press against collars 45 on the pins 42 and 43. The inner ends of the pins 42 and 43 are preferably beveled as shown at 42[a] and 43[a] so as to make easy contact with the ends of the teeth 46 on the toothed wheel 47 which is attached to the end of the wrist pin 19 by the bolt 48, but which can be secured to the wrist pin in any convenient way so that it will turn with it. The teeth 46 of the toothed wheel 47 are spaced apart the right distance to give to the pins 42 and 43 and consequently to the valve, the desired movement and at the right time, as will presently appear. The toothed wheel 47 and the wrist pin 19 are turned by means of the ratchet wheel 49 which is secured to the wrist pin, and which is actuated by a pawl 50 which is preferably in the form of a rod, and it is pressed into engagement with the ratchet wheel by a spring 51 which presses against a shoulder 52 on the pawl 50 and is held in place by the nut 53 as shown in Fig. 10. In order that the wrist pin may not turn, and in order that the ratchet wheel 49 may be held rigid while the pawl 50 is traveling back over a tooth, a detent wheel 54 having notches 55, is secured to the wrist pin and is engaged by a detent 56 (see Figs. 6 and 7) this detent being pressed by a spring 57 which is backed by a nut 58 as shown in Fig. 6. Of course it will be understood that any other suitable detent can be substituted for that shown.

Referring to the means for actuating the pins 42 and 43, it will be seen that at each stroke of the piston the connecting rod 18, by reason of its connection with the crank shaft, will oscillate, and the oscillation will first bring the pawl 50 back into engagement with a tooth of the ratchet wheel 49, and the next oscillation of the connecting rod will carry the ratchet wheel forward a distance of one tooth and will thereby turn the toothed wheel 47 and actuate the pins 42 and 43. It will be noticed that the arrangement described besides actuating the pins 42 and 43, serves the further purpose of turning the wrist pin 19 step by step at each oscillation of the connecting rod, so that the wrist pin has all its parts subjected to an even wear, which is a distinct advantage as in many types of engine the connection is such that the wrist pin soon wears on one side, or on opposite sides. It will be seen that if several cylinders are used, the only thing necessary in order to time the strokes and valve movements properly, is to adjust the ratchet wheel 49 and toothed wheels 47, and this can be done by simply moving a desired connecting rod forward and back as desired to bring the ratchet wheel into the right relation with the ratchet wheels on the other wrist pins.

With the valve and piston in the position shown in Fig. 1, a charge can flow in by suction on the down stroke of the piston, at the end of which the part 43[b] strikes the arm 41 and moves the valve to the position shown in Fig. 2. The up stroke of the piston will be in the position shown in Fig. 3, the valve remaining in position to close the ports as the teeth of the wheel 47 will not have engaged the pin 42 during this stroke. The piston then descends, and the pin 43 is thrown out so as to strike the arm 41 and open the exhaust port 23. This port remains open during the up stroke till the piston nears the cylinder head and that gives ample opportunity for the exhaust. The pin 42 will strike the arm 40 and move the valve to the position shown in Fig. 1 ready for another cycle.

From the foregoing description it will be seen that the engine is very simple in construction, that it has few parts, and that these are readily accessible, and that the operation is positive and reliable.

I claim:—

1. A gas engine comprising a cylinder, a piston reciprocating therein, the cylinder having a segmental recess in one wall opening directly into the cylinder and with a port leading directly into said recess, a valve seated and sliding in the aforesaid recess to open and close the port the inner wall of the valve being subject to the cylinder pressure, and located without the effective piston sweep, and means for actuating the valve.

2. A gas engine comprising a cylinder having a segmental recess in its inner wall, inlet and exhaust ports connected with the recess, a valve seated and sliding in the recess so as to open and close the said ports, a valve rod sliding in the cylinder wall and connected to the said valve, arms projecting inwardly from the rod near the upper and lower ends of the cylinder, and means carried by the piston to engage the said arms and actuate the valve.

3. A gas engine comprising a cylinder having in-take and exhaust ports, a valve moving in a recess in the inner wall of the cylinder opposite the said ports, a valve rod extending longitudinally through the cylinder wall and connected to the said valve, arms projecting inwardly from the upper and lower portions of the rod, and pins or abutments on the piston to engage the said arms and actuate the valve.

4. A gas engine comprising a cylinder, a piston reciprocating in the cylinder, a valve sliding in a recess in the cylinder wall and controlling the in-take and exhaust ports to the cylinder, a valve rod extending longitudinally of the cylinder and connected to the aforesaid valve, arms projecting from the rod near the upper and lower end thereof, means carried by the piston to strike the arms and operate the valve, and an automatic device in the piston to regulate the length of the said arm striking means.

5. In a gas engine the combination with the cylinder having in-take and exhaust ports, of the slide valve controlling said ports, a piston sliding in the cylinder, means for actuating the valve by the piston strokes, and a retaining device arranged to temporarily hold the slide valve in position to close both ports and at the same time close the spark plug circuit of the engine.

6. In a gas engine the combination with the cylinder having in-take and exhaust ports, and the slide valve moving opposite the ports, of the piston sliding in the cylinder, the valve rod extending parallel with the stroke of the piston and provided with inwardly extending striking arms, means for actuating the arms by the piston, a retaining device arranged to engage the valve rod and temporarily support the valve in position to close the ports, said retaining device also serving to make and break the spark plug circuit.

7. In a gas engine the combination with the cylinder having in-take and exhaust ports, a slide valve moving over the ports and in the cylinder wall, a valve rod arranged parallel with the cylinder and connected with the valve, said rod having a socket therein and a spring pressed detent engaging the socket, of striking arms secured to the rod and extending into the cylinder, a piston sliding in the cylinder, and means on the piston to engage the striking arms.

8. In a gas engine the combination with the cylinder, piston, and crank shaft, of the wrist pin journaled in the piston, the connecting rod pivoted to the crank shaft and journaled on the wrist pin, and a pawl and ratchet connection between the connecting rod and wrist pin by which the oscillation of the connecting rod turns the wrist pin.

9. In a gas engine the combination with the cylinder, slide valve, striking arms for operating the valve, the piston sliding in the cylinder, the striking pins on the piston to engage the striking arms, the crank shaft and connecting rod, of means actuated by the oscillation of the connecting rod to control the position of the aforesaid striking pins.

10. In a gas engine the combination with the cylinder, valve, and striking arms for actuating the valve, of the piston sliding in the cylinder, the crank shaft and rod connecting with the piston, striking pins projecting from the piston to engage the striking arms and movable in and out with relation to said arms, the toothed wheel having its teeth arranged to engage said striking pins, and means for actuating the toothed wheel by the oscillation of the piston connecting rod.

11. In a gas engine the combination with the cylinder, valve, and striking arms for actuating the valve, of the piston sliding in the cylinder, the crank shaft, the connecting rod, a wrist pin in the piston, a pawl and ratchet connection between the wrist pin and connecting rod, striking pins projecting from the piston to engage the said striking arms, and means actuated by the turning of the wrist pin for forcing out the said striking pins.

12. A gas engine comprising a cylinder, a piston reciprocating therein, the cylinder having a segmental recess in one wall above the effective sweep of the piston, opening directly into the cylinder and with exhaust and intake ports in close proximity leading into said recess, a valve seated and sliding in the aforesaid recess so as to open and close the intake and exhaust ports, the inner wall of the valve being open to the cylinder pressure, and means for actuating the valve.

13. A gas engine comprising a cylinder, a piston reciprocating therein, the cylinder having a segmental recess in one wall opening directly into the cylinder and with a port leading into said recess, a valve seated and sliding in the aforesaid recess to open and close the port the inner wall of the valve being subject to the cylinder pressure and located without the effective piston sweep, means for holding said valve in the recess and means for actuating the valve.

GEORGE E. McELROY.

Witnesses:

ERNEST A. GEOFFRAY,

GEO. E. HELLER.

Copies of this patent may be obtained for five cents each, by addressing the "Commissioner of Patents, Washington, D. C."